United States Patent [19]
Shiell et al.

[11] Patent Number: 5,850,543
[45] Date of Patent: Dec. 15, 1998

[54] MICROPROCESSOR WITH SPECULATIVE INSTRUCTION PIPELINING STORING A SPECULATIVE REGISTER VALUE WITHIN BRANCH TARGET BUFFER FOR USE IN SPECULATIVELY EXECUTING INSTRUCTIONS AFTER A RETURN

[75] Inventors: Jonathan H. Shiell, Plano; Donald E. Steiss, Richardson, both of Tex.

[73] Assignee: Texas Instruments Incorporated, Dallas, Tex.

[21] Appl. No.: 741,878

[22] Filed: Oct. 30, 1996

[51] Int. Cl.$^6$ ........................................................ G06F 9/38
[52] U.S. Cl. ............................................. 395/585; 395/582
[58] Field of Search ...................................... 395/582, 584, 395/585, 587

[56] References Cited

U.S. PATENT DOCUMENTS

| | | | |
|---|---|---|---|
| 5,136,697 | 8/1992 | Johnson | 395/584 |
| 5,226,126 | 7/1993 | McFarland et al. | 395/393 |
| 5,313,634 | 5/1994 | Eickemeyer | 395/587 |
| 5,353,419 | 10/1994 | Touch et al. | 395/582 |
| 5,604,877 | 2/1997 | Hoyt et al. | 395/590 |
| 5,623,614 | 4/1997 | Van Dyke et al. | 395/587 |

*Primary Examiner*—Richard L. Ellis
*Attorney, Agent, or Firm*—Rebecca Mapstone-Lake; James C. Kesterson; Richard L. Donaldson

[57] ABSTRACT

A microprocessor of the superscalar pipelined type, having speculative execution capability, is disclosed. Speculative execution is under the control of a fetch unit having a branch target buffer and a return address stack, each having multiple entries. Each entry includes an address value corresponding to the destination of a branching instruction, and an associated register value, such as a stack pointer. Upon the execution of a subroutine call, the return address and current stack pointer value are stored in the return address stack, to allow for fetching and speculative execution of the sequential instructions following the call in the calling program. Any branching instruction, such as the call, return, or conditional branch, will have an entry included in the branch target buffer; upon fetch of the branch on later passes, speculative execution from the target address can begin using the stack pointer value stored speculatively in the branch target buffer in association with the target address.

25 Claims, 4 Drawing Sheets

FIG. 3
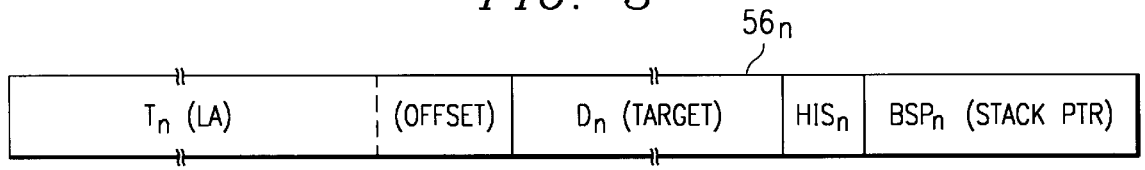
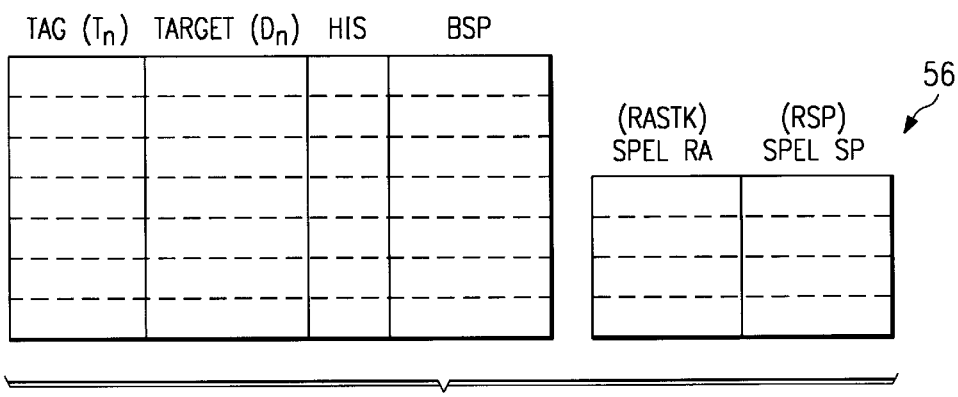
FIG. 4a
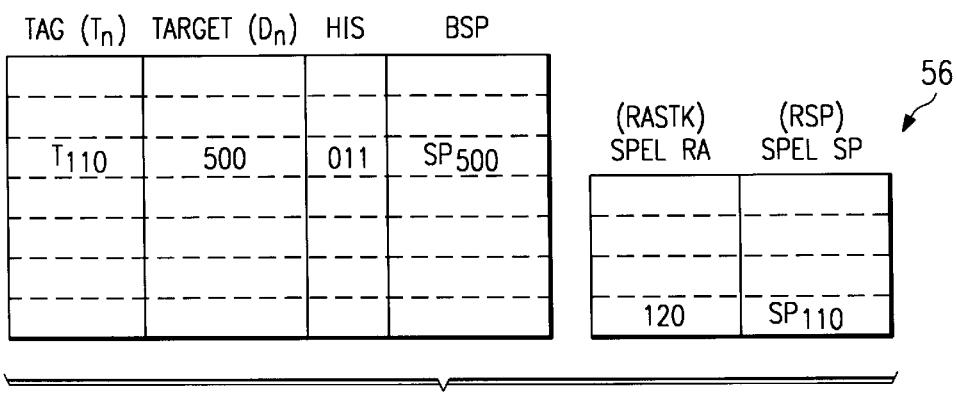
FIG. 4b

FIG. 4c

| TAG ($T_n$) | TARGET ($D_n$) | HIS | BSP |
|---|---|---|---|
| $T_{110}$ | 500 | 011 | $SP_{500}$ |
| | | | |
| | | | |
| | | | |

| (RASTK) SPEL RA | (RSP) SPEL SP |
|---|---|
| | |
| | |
| | |
| | |

FIG. 4d

| TAG ($T_n$) | TARGET ($D_n$) | HIS | BSP |
|---|---|---|---|
| $T_{110}$ | 500 | 011 | $SP_{500}$ |
| $T_{700}$ | 120 | 010 | $SP_{120}$ |
| | | | |
| | | | |

| (RASTK) SPEL RA | (RSP) SPEL SP |
|---|---|
| | |
| | |
| | |
| | |

FIG. 4e

| TAG ($T_n$) | TARGET ($D_n$) | HIS | BSP |
|---|---|---|---|
| $T_{110}$ | 500 | 011 | $SP_{500}$ |
| $T_{700}$ | 120 | 010 | $SP_{120}$ |
| | | | |
| | | | |

| (RASTK) SPEL RA | (RSP) SPEL SP |
|---|---|
| | |
| | |
| 120 | $SP_{110}$ | ns
MICROPROCESSOR WITH SPECULATIVE INSTRUCTION PIPELINING STORING A SPECULATIVE REGISTER VALUE WITHIN BRANCH TARGET BUFFER FOR USE IN SPECULATIVELY EXECUTING INSTRUCTIONS AFTER A RETURN

This invention is in the field of microprocessors, and is more specifically directed to program control techniques for assisting speculative execution in microprocessors of the pipelined superscalar type.

Background of the Invention

Significant advances have recently been made in the design of microprocessors to improve their performance, as measured by the number of instructions executed over a given time period. One such advance relates to the recent introduction of microprocessors of the "superscalar" type, which can effect parallel instruction computation with a single instruction pointer. Typically, superscalar microprocessors have multiple execution units, such as multiple integer arithmetic logic units (ALUs) and a floating point unit (FPU), for executing program instructions, and thus have multiple pipelines. As such, multiple machine instructions may be executed simultaneously in a superscalar microprocessor, providing obvious benefits in the overall performance of the device and its system application.

Another common technique used in modern microprocessors to improve performance involves the "pipelining" of instructions. As is well known in the art, microprocessor instructions each generally involve several sequential operations, such as instruction fetch, instruction decode, retrieval of operands from registers or memory, execution of the instruction, and writeback of the results of the instruction. Pipelining of instructions in a microprocessor refers to the staging of a sequence of instructions so that multiple instructions in the sequence are simultaneously processed at different stages in the internal sequence. For example, if a pipelined microprocessor is executing instruction n in a given microprocessor clock cycle, a four-stage pipelined microprocessor may simultaneously (i.e., in the same machine cycle) retrieve the operands for instruction n+1 (i.e., the next instruction in the sequence), decode instruction n+2, and fetch instruction n+3. Through the use of pipelining, the performance of the microprocessor can effectively execute a sequence of multiple-cycle instructions at a rate of one per clock cycle.

Through the use of both pipelining and superscalar techniques, modern microprocessors may execute multi-cycle machine instructions at a rate greater than one per machine clock cycle, assuming that the instructions proceed in a known sequence. However, as is well known in the art of computer programming, many programs do not necessarily run in the sequential order of the instructions, but instead include branches (both conditional and unconditional) to program instructions that are not in the current sequence, subroutine calls, unconditional jumps, and other types of non-sequential operation. Such operations clearly provide a challenge to the pipelined microprocessor, in that the instructions in the microprocessor pipeline may not be the instructions that are actually executed. For example, a conditional branch instruction may, upon execution, cause a branch to an instruction other than the next sequential instruction currently in the pipeline, based upon the execution results. In this event, the results of those instructions currently in the pipeline will not be used, and the pipeline must then be "flushed", or emptied, so that the actual next instruction (i.e., the destination of the branch) can be fetched, decoded, and executed. This flushing spends multiple machine clock cycles before the execution of the next instruction can occur, and the intervening clock cycles required to re-fill the pipeline appear as idle cycles from the viewpoint of completed instructions.

The effect of this non-sequential operation, and of the resultant flushing of the pipeline, is exacerbated in the case of superscalar pipelined microprocessors. If, for example, a branch or other interruption in the sequential instruction flow of the microprocessor occurs in such microprocessors, the number of lost pipeline slots, or lost execution opportunities, is multiplied by the number of parallel execution units (i.e., parallel pipelines). The performance degradation due to branches and non-sequential program execution is therefore amplified in superscalar pipelined microprocessors.

In order to minimize the degradation of microprocessor performance that results from non-sequential program execution, many modern microprocessors now incorporate speculative execution based upon branch prediction. Branch prediction predicts, on a statistical basis, the results of each conditional branch (i.e., whether the branch will be "taken" or "not-taken"), and continues fetching instructions and operating the pipeline based on the predicted outcome of the condition. Those instructions that are fetched based upon such a prediction will proceed along the pipelines until the actual result of the condition is determined. If the prediction was correct, the speculative execution of the predicted instructions maintains the microprocessor at its highest performance level through full utilization of the pipeline. In the event that the prediction was not correct, the pipeline must be "flushed" to remove all instructions that have not yet completed. As is known in the art, the use of conventional branch prediction and speculative execution techniques has provided improved overall microprocessor performance.

By way of further background, conventional speculative execution techniques have included the use of branch target buffers (BTBs) and return address stacks. Conventional BTBs are cache-like buffers that are used in the fetch units of microprocessors to store an identifier of a previously performed branch instruction as a tag, along with the target address (i.e., the address to which the branch points in its predicted state) and an indication of the branch's history. Upon subsequent fetches of the branch, the target address is used (depending on the branch history) as the next address to fetch in the pipeline; upon execution of the branch instruction itself, the target address is compared against the actual next instruction address determined by the execution unit to verify whether the speculative execution was valid. Return address stacks, according to conventional techniques, store the next sequential instruction address to be executed after return from the subroutine (i.e., the next instruction in the calling program after a subroutine call), in similar fashion as the actual return address is stored in a logical stack upon execution of the call. The instruction address stored in the return address stack is used to speculatively fetch the next instruction after the return. Upon execution of the return, this value from the return address stack is compared against the actual return address popped from the logical stack to verify whether the speculative pipeline operation was valid.

Despite the use of these techniques, pipeline stalls can still occur in the event of branches and subroutine calls, due to conflicts (or "interlocks") in the use of certain microprocessor resources. For example, an instruction may require, at an early stage in the pipeline, the contents of a certain register location that will not be written until the completion of the execution stage of an earlier-in-time instruction. The interlock arises because the later instruction must wait until the register is written upon execution of the earlier instruction. While the pipeline does not need to be flushed in this event, the instructions in the pipeline cannot advance until the interlock is resolved (i.e., until the register or other resource is released by the earlier instruction). These interlocks can occur not only in the case of speculative execution, but also in the case of unconditional branches, subroutine calls, and the like. As should be readily apparent, such interlocks degrade the overall performance of the microprocessor, as idle machine clock cycles are required in such cases.

By way of further background, and as mentioned above, the use of a portion of memory as a logical "stack" is well known in the art. A conventional stack is implemented as a group of multiple memory locations that are dealt with in a last-in-first-out manner, where the contents of a register, commonly referred to as the stack pointer, contain the current address of the "top" of the stack. The stack will be defined by the architecture of the microprocessor; for example, the stack in x86-architecture microprocessors is that portion of memory in the SS segment to which the SP register points. Other architectures, such as the IBM 360 architecture, may not use a stack (i.e., a portion of memory) but may instead use a register that is identified by an operand in the return instruction, to store the return address in a similar fashion as a stack. Those architectures having stacks also generally respond to simple instructions, such as PUSH and POP, to store data to and load data from the stack, respectively, modifying the stack pointer accordingly in either case. The stack of a microprocessor is often used in connection with subroutine calls, as it provides a convenient conduit for the passing of parameters back and forth between a calling program and a subroutine. In addition, as noted above, subroutine calls also generally PUSH the return address onto the stack, during their execution.

It has been discovered, in connection with the present invention, that subroutine calls in superscalar x86 architecture microprocessors can give rise to interlocks due to conflicts regarding the stack pointer. This is because subroutine calls and returns, each of which can be multiple-cycle instructions, perform stack operations (such as the PUSH and POP of the return address) and thus modify the stack pointer in their execution stage. Scalar microprocessors can typically assume a value for the stack pointer in speculatively executed instructions, based on the single pipeline. However, in conventional superscalar microprocessor designs, instructions that immediately follow the execution of calls and returns, and that perform stack operations (and thus modify the stack pointer), cannot be executed until the completion of the call or return, as the contents of the stack pointer may be modified by the execution of a parallel instruction. Similar problems may also arise in those architectures that use registers, rather than a stack, for the storage of information relating to the target addresses of calls and returns.

It is therefore an object of the present invention to provide a superscalar microprocessor and method of operating the same so as to avoid interlocks in call and return instructions.

It is a further object of the present invention to provide such a microprocessor and method in which interlocks are avoided by extending conventional stack and branch target buffer entries to incorporate register values.

It is a further object of the present invention to provide such a microprocessor and method in which speculative execution is assisted.

Other objects and advantages of the present invention will be apparent to those of ordinary skill in the art having reference to the following specification together with its drawings.

SUMMARY OF THE INVENTION

The invention may be implemented into a microprocessor by providing extensions to existing return address stack or branch target buffer entries used in connection with selected branching instructions, such as subroutine call and return instructions. The extension provides a location at which to store the contents of a register, for example the stack pointer, in association with the destination of the branching instruction. The register contents stored in the extension is matched, in combination with the stored destination, with the contents of the same register as used in speculatively executed instructions following the branching instruction, to determine whether the speculative execution was valid. The frequency of interlocks in the pipelined operation of the microprocessor is thus reduced, as values for the register are made available to sequential instructions.

BRIEF DESCRIPTION OF THE DRAWINGS

FIG. 3 is a schematic representation of the contents of an entry in the branch target buffer (BTB) according to the preferred embodiment of the invention.

FIGS. 4a, 4b, 4c, 4d, and 4e are representations of the contents of the return address stack and branch target buffer, with stack pointer extensions, at various stages of the execution of a code fragment, according to the preferred embodiment of the invention.

DETAILED DESCRIPTION OF THE PREFERRED EMBODIMENT

Figure 1:
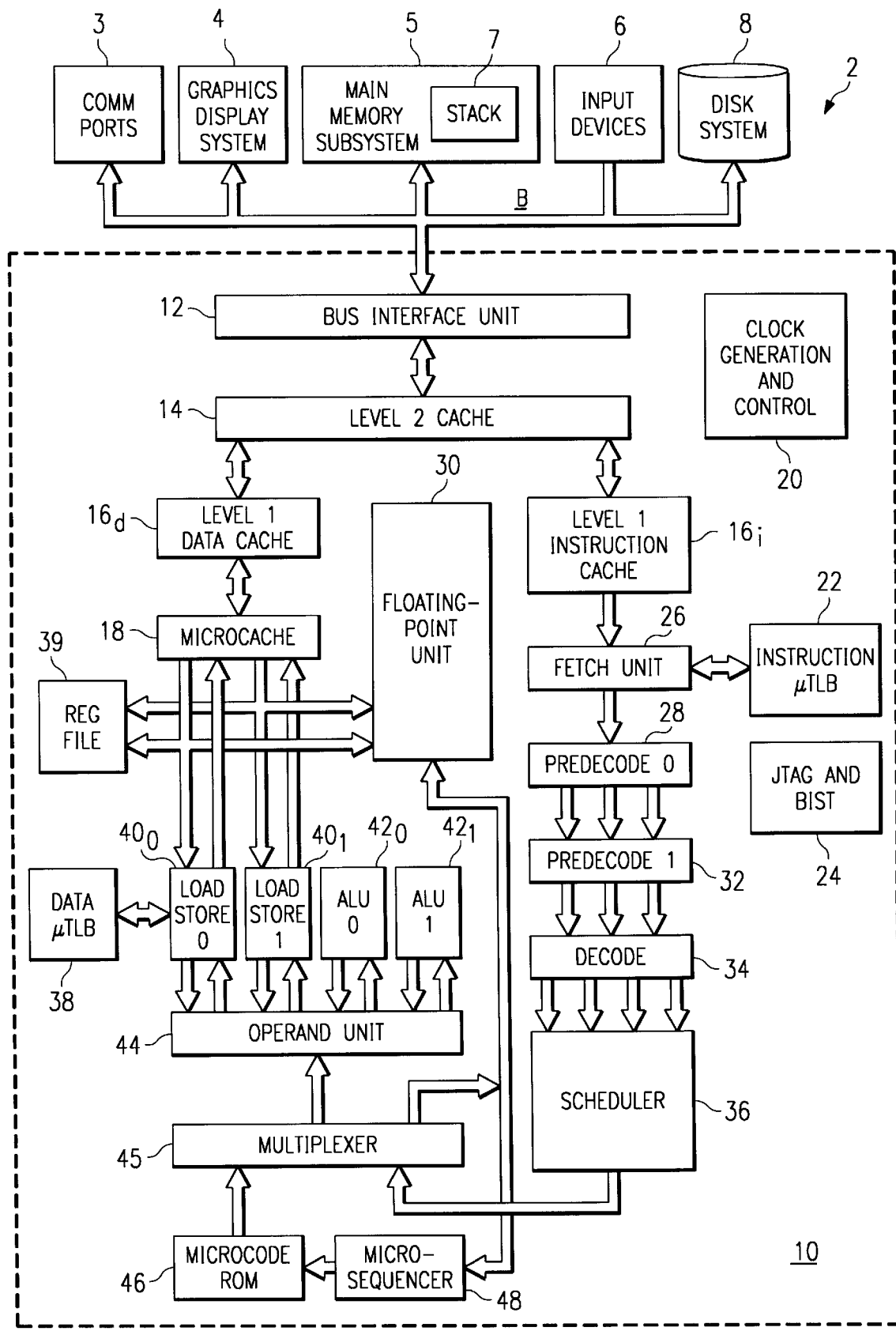
FIG. 1 is an electrical diagram, in block form, of a superscalar microprocessor according to the preferred embodiment of the invention is implemented.

Referring now to FIG. 1, an exemplary data processing system 2, including an exemplary superscalar pipelined microprocessor 10 within which the preferred embodiment of the invention is implemented, will be described. It is to be understood that the architecture of system 2 and of microprocessor 10 is described herein by way of example only, as it is contemplated that the present invention may be utilized in microprocessors of various architectures, with particular benefit to those of the superscalar type. It is therefore contemplated that one of ordinary skill in the art, having reference to this specification, will be readily able to implement the present invention in such other microprocessor architectures.

Microprocessor 10, as shown in FIG. 1, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 2 contains such conventional subsystems as communication ports 3 (including modem ports and modems, network interfaces, and the like), graphics display system 4 (including video memory, video processors, a graphics monitor), main memory system 5 which is typically implemented by way of dynamic random access memory (DRAM), input devices 6 (including keyboard, a pointing device, and the interface circuitry therefor), and disk system 8 (which may include hard disk drives, floppy disk drives, and CD-ROM drives). It is therefore contemplated that system 2 of FIG. 1 corresponds to a conventional desktop computer or workstation, as are now common in the art. Of course, other system implementations of microprocessor 10 can also benefit from the present invention, as will be recognized by those of ordinary skill in the art.

Microprocessor 10 includes bus interface unit 12 that is connected to bus B, and which controls and effects communication between microprocessor 10 and the other elements in system 2. BIU 12 includes the appropriate control and clock circuitry to perform this function, including write buffers for increasing the speed of operation, and including timing circuitry so as to synchronize the results of internal microprocessor operation with bus B timing constraints. Microprocessor 10 also includes clock generation and control circuitry 20 which, in this exemplary microprocessor 10, generates internal clock phases based upon the bus clock from bus B; the frequency of the internal clock phases, in this example, may be selectably programmed as a multiple of the frequency of the bus clock.

As is evident in FIG. 1, microprocessor 10 has three levels of internal cache memory, with the highest of these as level 2 cache 14, which is connected to BIU 12. In this example, level 2 cache 14 is a unified cache, and is configured to receive all cacheable data and cacheable instructions from bus B via BIU 12, such that much of the bus traffic presented by microprocessor 10 is accomplished via level cached 14, of course, microprocessor 10 may also effect bus traffic around cache 14, by treating certain bus reads and writes as "not cacheable". Level 2 cache 14, as shown in FIG. 1, is connected to two level 1 caches 16; level 1 data cache $16_d$ is dedicated to data, while level 1 instruction cache $16_i$ is dedicated to instructions. Power consumption by microprocessor 10 is minimized by only accessing level 2 cache 14 only in the event of cache misses of the appropriate one of the level 1 caches 16. Furthermore, on the data side, microcache 18 is provided as a level 0 cache, and in this example is a fully dual-ported cache.

As shown in FIG. 1 and as noted hereinabove, microprocessor 10 is of the superscalar type. In this example multiple execution units are provided within microprocessor 10, allowing up to four instructions to be simultaneously executed in parallel for a single instruction pointer entry. These execution units include two ALUs $42_0$, $42_1$ for processing conditional branch, integer, and logical operations, floating-point unit (FPU) 30, two load-store units $40_0$, $40_1$, and microsequencer 48. The two load-store units 40 utilize the two ports to microcache 18, for true parallel access thereto, and also perform load and store operations to registers in register file 39. Data microtranslation lookaside buffer ($\mu$TLB) 38 is provided to translate logical data addresses into physical addresses, in the conventional manner.

These multiple execution units are controlled by way of multiple seven-stage pipeline These stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units |
| OP | Operand: This stage retrieves the register operands indicated by the AOps |
| EX | Execute: This stage runs the execution units according to the AOps and the retrieved operands |
| WB | Write back: This stage stores the results of the execution in registers or in memory |

Referring back to FIG. 1, the pipeline stages noted above are performed by various functional blocks within microprocessor 10. Fetch unit 26 generates instruction addresses from the instruction pointer, by way of instruction microtranslation lookaside buffer ($\mu$TLB) 22, which translates the logical instruction address to a physical address in the conventional way, for application to level 1 instruction cache 16. Instruction cache $16_i$ produces a stream of instruction data to fetch unit 26, which in turn provides the instruction code to the predecode stages in the desired sequence. Speculative execution is primarily controlled by fetch unit 26, in a manner to be described in further detail hereinbelow.

Predecoding of the instructions is broken into two parts in microprocessor 10, namely predecode 0 stage 28 and predecode 1 stage 32. These two stages operate as separate pipeline stages, and together operate to locate up to three x86 instructions and apply the same to decoder 34. As such, the predecode stage of the pipeline in microprocessor 10 is three instructions wide. Predecode 0 unit 28, as noted above, determines the size and position of as many as three x86 instructions (which, of course, are variable length), and as such consists of three instruction recognizers; predecode 1 unit 32 recodes the multi-byte instructions into a fixed-length format, to facilitate decoding.

Decode unit 34, in this example, contains four instruction decoders, each capable of receiving a fixed length x86 instruction from predecode 1 unit 32 and producing from one to three atomic operations (AOps); AOps are substantially equivalent to RISC instructions. Three of the four decoders operate in parallel, placing up to nine AOps into the decode queue at the output of decode unit 34 to await scheduling; the fourth decoder is reserved for special cases. Scheduler 36 reads up to four AOps from the decode queue at the output of decode unit 34, and assigns these AOps to the appropriate execution units. In addition, the operand unit 44 receives and prepares the operands for execution. As indicated in FIG. 1, operand unit 44 receives an input from sequencer 44 and also from microcode ROM 46, via multiplexer 45, and fetches register operands for use in the execution of the instructions. In addition, according to this example, operand unit performs operand forwarding to send results to registers that are ready to be stored, and also performs address generation for AOps of the load and store type.

Microsequencer 48, in combination with microcode ROM 46, control ALUs 42 and load/store units 40 in the execution of microcode entry AOps, which are generally the last AOps to execute in a cycle. In this example, microsequencer 48 sequences through microinstructions stored in microcode ROM 46 to effect this control for those microcoded microinstructions. Examples of microcoded microinstructions include, for microprocessor 10, complex or rarely-used x86 instructions, x86 instructions that modify segment or control registers, handling of exceptions and interrupts, and multi-cycle instructions (such as REP instructions, and instructions that PUSH and POP all registers).

Microprocessor 10 also includes circuitry 24 for controlling the operation of JTAG scan testing, and of certain built-in self-test functions, ensuring the validity of the operation of microprocessor 10 upon completion of manufacturing, and upon resets and other events.

Figure 2:
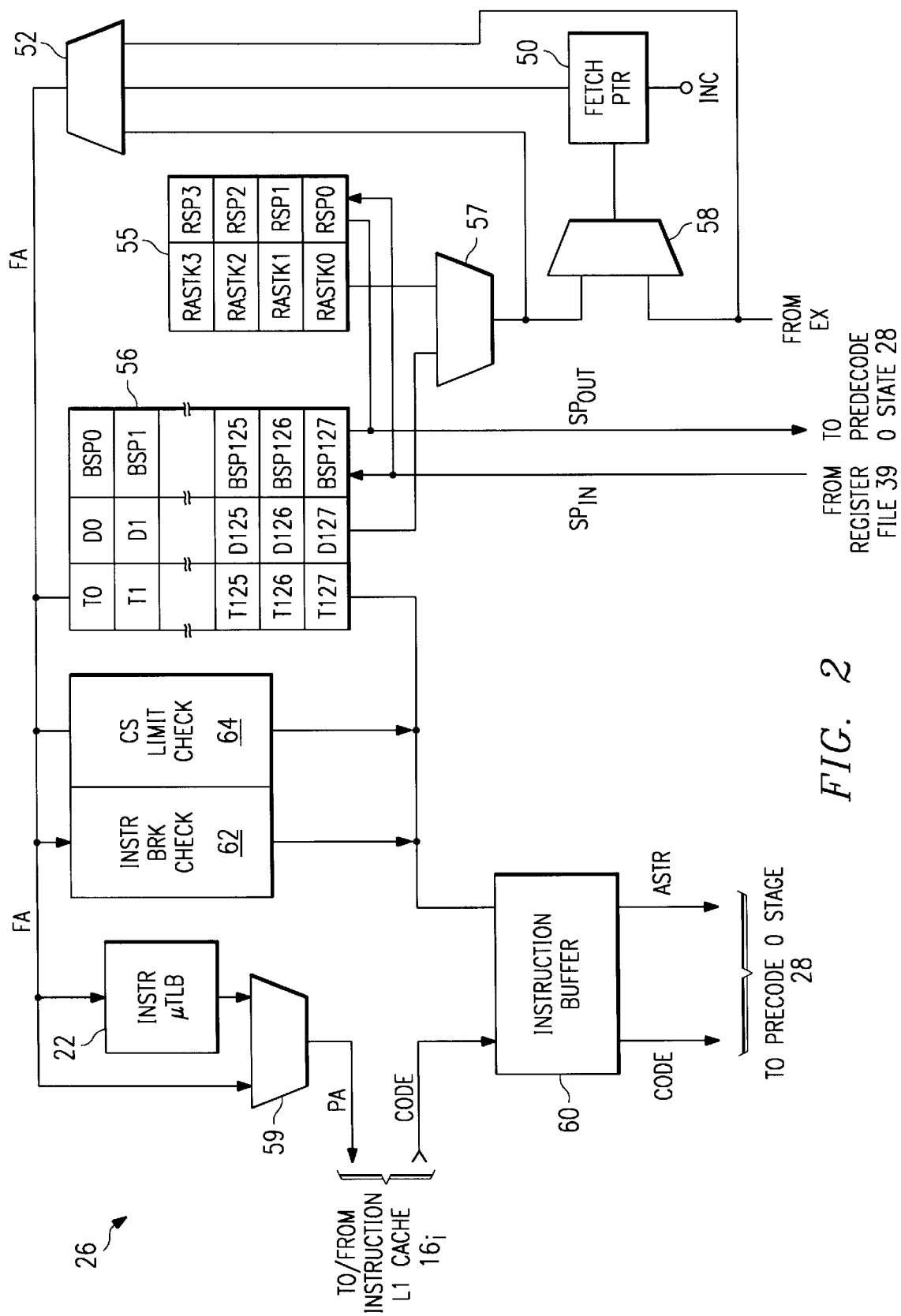
FIG. 2 is an electrical diagram, in block form, of the fetch unit of the microprocessor of FIG. 1, according to the preferred embodiment of the invention.

Referring now to FIG. 2, the construction and operation of fetch unit 26 according to the preferred embodiment of the invention will now be described. As noted above, fetch unit 26 performs the function of determining the address of the next instruction to be fetched for decode. As such, fetch unit 26 determines the sequence in which instructions are loaded into the pipelines of microprocessor 10, and in this embodiment of the invention thus controls the speculative execution of addresses, particularly by way of branch prediction.

The operation of fetch unit 26 is based upon a logical fetch address FA that is generated according to one of several ways. Fetch address FA may be generated merely by the incrementing of fetch pointer 50 in fetch unit 26, in the case where the next sequential address is to be fetched for decoding. As shown in FIG. 2, fetch pointer 50 is a register in fetch unit 26, having an increment control input INC, and which presents its output to one input of multiplexer 52. A second way in which the fetch address FA is generated is by one of the execution units (e.g., microsequencer 48) in the event of a branch that is not predicted by fetch unit 26 (as will be described hereinbelow); in this event, where the address of the next instruction to be fetched is generated in the execution stage of the pipeline, the fetch address FA is presented, by an execution unit, on line MPBR to multiplexer 52. Fetch unit 26 also includes circuitry for generating the next fetch address FA in ways that are not in program sequence. As shown in FIG. 2, fetch unit 26 includes return address stack 55, which is a last-in-first-out (LIFO) memory having several locations, at which return addresses for subroutine calls and subroutine returns are stored for use in speculative execution, as will be described in further detail hereinbelow. In addition, as will be described in further detail hereinbelow, fetch unit 26 also includes a branch target buffer (BTB) 56, which is a cache-like arrangement of entries that store target addresses of branches, and data indicating the predicted condition of the branch, from which fetch addresses FA may be generated to maintain the pipeline in a filled condition based upon prediction of the branch. Outputs from return address stack 55 and BTB 56 are presented, by way of multiplexer 57, to the third input of multiplexer 52, and the appropriate one of these outputs is used to update fetch counter 50, under the control of multiplexer 58. The three inputs to multiplexer 52 thus present three ways in which fetch address FA is generated, depending upon the state of operation of microprocessor 10.

Fetch address FA is presented, in fetch unit 26, to various functions therein in order to control the fetching of the next instruction for decoding. For example, fetch unit 26 is in communication with instruction μTLB 22, which may quickly return a matching physical address PA for logical fetch address FA if an entry for fetch address FA is contained therein. In any event, a physical address is presented by fetch unit 26, either directly or from instruction μTLB 22 via multiplexer 59, to instruction level 1 cache 16$_i$ for retrieval of instruction code therefrom; of course, if a cache miss at instruction level 1 cache 16$_i$ occurs, the physical address PA is presented to unified level 2 cache 14 and, in the event of a cache miss at that level, to main memory. In response to physical address PA, instruction level 1 cache 16$_i$ presents an instruction code sequence CODE to instruction buffer 60 in fetch unit 26, for eventual presentation to predecode 0 stage 28. In the case where each physical address PA addresses a block of sixteen instructions, instruction buffer 60 has a capacity of sixteen instructions.

Fetch unit 26 also includes other conventional functions, such as instruction break check circuit 62 which halts additional fetching for instructions identified as breaks. Fetch unit 26 also includes a code segment limit check circuit 64, for determining whether fetch address FA is outside the limit of the bounds of the current code segment.

Logical fetch address FA is connected to an input of BTB 56, which determines whether fetch address FA points to a branch instruction that has recently been fetched, and which may have branch history stored in BTB 56 for use in speculative execution. As noted hereinabove, speculative execution is an especially important performance enhancement in deeply pipelined microprocessors such as superscalar microprocessor 10 of FIG. 1, as mispredicted branches (or pipeline stalls awaiting the results of a conditional branch) result in severe penalties, measured in lost execution opportunities. BTB 56 is a memory arranged in a cache-like configuration, for example as a 512 entry, 4-way set associative cache buffer. FIG. 2 illustrates BTB 56 in a simplistic fashion, for a single way. Each way in BTB 56, in this example, has 128 tags T0 through T127 associated with 128 data entries D0 through D127; each way of BTB 56 further includes 128 speculative stack pointer entries SP0 through SP127 for assisting speculative execution, as will be described in further detail hereinbelow. Additional bits such as LRU bits and other control bits (not shown), are provided in BTB 56, shared among the ways.

FIG. 3 illustrates a single tag and associated entry 56$_n$ in BTB 56, according to this preferred embodiment of the invention. Tag T$_n$ shown in FIG. 3 includes a logical address portion LA that is the address of a recently performed "branching" instruction, i.e., an instruction that recently effected a non-sequential instruction fetch (such as a branch), with tag T$_n$ including an offset portion indicating the starting offset of the specific instruction within the sixteen instruction code line associated with logical address LA. Alternatively, physical addresses may be used as the tag in BTB 56, if desired. Entry 56$n$ has, associated with tag T$_n$, a data entry D$_n$ that corresponds to the target address of the branching instruction identified by tag T$_n$.

Following the data entry D$_n$ in entry 56$n$ is a three-bit history field HIS$_n$, which indicates the branch history (and thus predicted state) of the branching instruction, and also the type of branch, corresponding to entry 56$n$. For purposes of this example, branching instructions that can initiate speculative execution include conditional branch instructions, other non-sequential instructions such as subroutine calls and returns, and unconditional branches. As such, the type of branching instruction is indicated in history field HIS$_n$, as the prediction need only apply to conditional branches. In this example, history field HIS$_n$ is a three-bit field, with the indication of branch type and prediction as follows:

| | | |
|---|---|---|
| 111 | conditional branch | Strongly Predicted Taken (ST) |
| 110 | conditional branch | Predicted Taken (T) |
| 101 | conditional branch | Predicted Not Taken (NT) |
| 100 | conditional branch | Strongly Predicted Not Taken (SNT) |
| 011 | CALL | |
| 010 | RETurn | |

-continued

| | |
|---|---|
| 001 | unconditional branch (JUMP) |
| 000 | invalid |

The states ST, T, NT, SNT for predicting the result of a conditional branch are indicative of the history of the conditional branch, and thus the prediction of its result. A new conditional branch obtains either a T or NT history upon its first execution; this history is stored in BTB 56 with the entry for that branch instruction. If the same result occurs in a second successive occurrence of the branch, the "strongly" states are entered; for example, two successive not-taken results sets the history for a branch to SNT, and two successive taken results conversely sets the history to ST. If a history field HIS is set to a "strongly" state, the next opposite result will move the history information to a "not-strongly" state; for example, if an SNT branch is "taken", its history is then changed to NT. Of course, since CALLs, RETurns, and JUMPs are unconditional, no prediction or history is appropriate.

According to the preferred embodiment of the invention, each entry $56_n$ in BTB 56 also includes a field $BSP_n$ by way of which a register value may be associated with the branch or call instruction. Specifically, as will be described in further detail hereinbelow, the value of the stack pointer SP at the time of a subroutine call or return will be stored in the field $BSP_n$, at the time that the remainder of the entry $56_n$ is stored in BTB 56 for the call or return. The value of the stack pointer is presented to BTB 56 from register file 39 on lines SPIN. As will be described in further detail hereinbelow, speculative execution of the sequential instructions following the call or return may then be performed using the value of the stack pointer that is stored in BTB 56 (referred to hereinafter as the "branch-speculative stack pointer), as presented to predecode 0 stage 28 on lines $SP_{OUT}$ along with the fetched speculative instruction; following the execution of the call or return, the actual value of the stack pointer as calculated by the execution unit is compared against the branch-speculative stack pointer value used in the speculative execution, to verify the validity of the speculative pipeline.

As is conventional in microprocessors, the execution of a subroutine call conventionally involves a push of the return address, which is the next sequential address after the call (i.e., the instruction to which program control is to be passed upon return from the call) onto logical stack 7 in main memory 5 (as shown in FIG. 1). Upon execution of the return from the subroutine, the return address is popped from the return address stack, and presented to fetch unit 26 by the execution unit for use as fetch address FA.

According to this embodiment of the invention, fetch unit 26 includes return address stack 55, having multiple entries, each of which includes a first portion $RASTK_n$ for storing the next sequential instruction address as a speculative return address for each subroutine call, and also includes a second portion $RSP_n$ for storing an associated value of a register, such as the stack pointer, for use in the speculative execution. As noted hereinabove, the use of a return address stack for storing the next sequential instruction address after a subroutine call is known in the art. As a result of the fetch of a subroutine call instruction, fetch unit 26 stores, in return address stack 55, the address of the next sequential instruction following the call in the calling program (e.g., the main program), which is the instruction to which control will likely pass upon completion of and return from the called subroutine. This return address is stored in return address stack 55 in LIFO fashion, with the multiple entries allowing for nested subroutines. Similarly, upon execution of the subroutine call, the appropriate execution unit (e.g., microsequencer 48) will push the return address onto logical stack 7 in main memory 5. As is known in the art, fetch unit 26 will continue to maintain a full pipeline during the operation of the subroutine by fetching the subroutine instructions in sequence. Upon such time as the return from the subroutine is fetched by fetch unit 26, speculative execution of the return instruction and the sequential instructions following the call (i.e., those instructions in the calling program sequence following the call) is performed by popping, from return address stack 55, the speculative return address value for use in the speculative execution of the return. Upon execution of the actual return, this speculative return address is compared with the actual return address popped from logical stack 7, to verify the validity of the speculative execution.

Return address stack 55 may also store optional control information for each entry. This control information, as is known in the art, may include such information as validity bits, type bits, and the like.

According to this preferred embodiment of the invention, return address stack 55 also includes, for each entry, a portion RSP for storing the value of a register, such as the stack pointer, along with the speculative return address. As in the case of BTB 56, the value of the speculative stack pointer to be stored in return address stack 55 is provided by the stack pointer in register file 39 during the fetch stage of the subroutine call instruction, on lines SPIN. In the speculative execution of the subroutine return and following instructions, the speculative stack pointer value stored in return address stack 55 is provided along with its associated speculative return address. Upon execution of the actual subroutine return, this speculative stack pointer value is compared against the actual stack pointer value generated by the execution unit, to verify validity of the speculative execution.

As described above, microprocessor 10 according to this embodiment of the invention incorporates stack pointer extensions for both of the branch target buffer (BTB) 56 and the return address stack 55. It is contemplated that providing both of these extensions is preferred for the highest performance of microprocessor 10. However, it is also contemplated that either one or the other of these stack pointer extensions may be used without the other, and benefits provided thereby, within the spirit of the present invention. In addition, while microprocessor 10 is described herein as using these extensions for storage of the stack pointer, it is also contemplated that the contents of other registers may be similarly associated with the destinations of branching instructions in this fashion. For example, in an x86 architecture microprocessor which uses segmented addressing for the stack pointer, one may also or instead associate the stack segment, which is the base address of the stack pointer, with the target of the branching instruction. Further in the alternative, the present invention may associate the code segment with branching instruction destinations of "far" calls in this manner, or still further in the alternative may associate an entire set of machine states with the destination of a task switch operation. Further in the alternative, the stack pointer extensions may alternatively store a pointer to the stack pointer register, to effect indirect access of the stack pointer.

The operation of microprocessor 10, incorporating extensions for both BTB 56 and return address stack 55 according to this embodiment of the invention, will now be described in combination with an exemplary code fragment, including a subroutine call, which is repeated. Of course, this code fragment is shown for purposes of example only, as the present invention is useful in other types of branching situations, as well.

An example of a code fragment with which the present invention is utilized is as follows:

```
...
100 PUSH AX
105 PUSH CX
110 CALL EXMPL
120 POP CX
125 POP AX
...
```

In this code fragment, parameters are pushed onto the stack in instructions 100 and 105 to pass them to the subroutine, in the conventional manner. The results of the execution of the subroutine are then returned to the register file upon return in instructions 120 and 125, also in the conventional manner. The exemplary subroutine EXMPL, which includes stack operations and thus modifications to the stack pointer, is as follows:

```
500 SUBROUTINE EXMPL
...
560 POP AX
565 POP CX
...
570 PUSH AX
...
590 PUSH CX
...
700 RET
```

Referring now to FIGS. 4a through 4e, the operation of fetch unit in speculative executing this code fragment, according to the preferred embodiment of the invention will now be described in detail. FIG. 4a illustrates the contents of BTB 56 and return address stack 55 in their initial state prior to completion of the first execution of instruction 100. As shown therein, upon the initial pass through the code fragment, the contents of BTB 56 and return address stack 55 (for those locations relevant to this code fragment) are empty.

As noted above, instructions 100 and 105 perform stack operations to pass parameters to subroutine EXMPL, and as such update the contents of the stack pointer. In addition, as is well known, the execution of a subroutine CALL also involves implicit stack operations, which will also update the value of the stack pointer. Since this is the first pass through this code fragment, instruction 110, which is the CALL to subroutine EXMPL, is not recognized by BTB 26, as there is no tag therein which matches that of instruction 110.

Upon the execution of instruction 110, however, both BTB 56 and return address stack 55 are updated with entries pertaining to this CALL, as shown in FIG. 4b. Upon execution of the CALL instruction 110, return address stack 55 receives, from the execution unit, an entry 120 which is the logical instruction address of the next sequential instruction 120 in the calling program following the CALL: according to this embodiment of the invention, the stack pointer extension of return address stack 55 also receives, on lines SPIN from register file 39, a speculative stack pointer value $SP_{110}$ which is the value of the stack pointer before the execution of the CALL of instruction 110, and which will thus be the value of the stack pointer upon return from the subroutine EXMPL for use by instruction 120. BTB 56 also receives an entry with a tag $T_{110}$ corresponding to instruction 110, a target value of 500 (the logical instruction address of the subroutine EXMPL), and a history field of 011 (indicating that instruction 110 was a CALL); also, according to this embodiment of the invention, the stack pointer extension of BTB 56 receives, on lines SPIN from register file 39, the value of the stack pointer that is to be used by instruction 500 in the subroutine EXMPL (as branch-speculative stack pointer value $SP_{500}$) in a manner associated with the tag for instruction 110. Since BTB 56 is a cache-like configuration, the location thereof at which these values are stored are not necessarily in a physical order, but will instead depend upon the value of $T_{110}$.

In this first pass through this code fragment, an interlock may develop relative to the stack pointer, depending upon the number of instructions in subroutine EXMPL before instruction 560 accesses the stack. However, the execution of the CALL of instruction 110 may not be finished with the stack and stack pointer at the time that the fetch and decode of instruction 560 could otherwise begin. A pipeline stall may thus be present in this first pass.

Pipelined execution of subroutine EXMPL thus continues, until such time as the RETurn instruction 700 is decoded by decode unit 34, at which time RETurn instruction 700 is first recognized as a subroutine return in this pass through the code fragment. At this point, the pipeline behind RETurn instruction 700 is flushed. Fetch unit 26 then pops the speculative return address 120 from return address stack 55, along with its associated speculative stack pointer value $SP_{110}$; as noted above, this value $SP_{110}$ is expected to correspond to the stack pointer value that instruction 120 will require, given the sequence of the calling program. Fetch unit 26 then presents the code for instruction address 120 (e.g., from instruction level 1 cache $16_i$) to predecode 0 stage 28 along with the associated speculative stack pointer value $SP_{110}$ for processing through the pipeline of microprocessor 10. Execution of RETurn instruction 700, as is well known, involves implicit operations on logical stack 7 (including at least the POP of the return address) and thus modification of the stack pointer, as is well known. In prior superscalar microprocessors, this use of the stack pointer in the execution of the RETurn instruction 700 would cause an interlock that would delay the pipelining and speculative execution of instruction 120. However, the use of the speculative stack pointer value $SP_{110}$ in the fetching of instruction 120 et seq., according to this embodiment of the invention, prevents any such interlock that would otherwise arise from the possibly conflicting use of the stack and stack pointer in the execution of the RETurn instruction 700 and by the speculative fetching and decoding of instruction 120. The contents of BTB 56 and return address stack 55 are shown, at this point after the first pass fetch of RETurn instruction 700 and before its execution, in FIG. 4c.

Upon execution of RETurn instruction 700, the execution unit compares both the speculative return address 120 and also the speculative stack pointer value $SP_{110}$ used in the speculative execution against the actual values of the return address and stack pointer, respectively, generated by the execution unit in effecting the return. If these values both match, the speculative pipeline execution of instruction 120 (and subsequent instructions) by microprocessor 10 was successful, and the pipeline remains filled. If either of these values do not match, however, the speculative execution is invalid, and the pipeline must be flushed.

In either case, upon execution of RETurn instruction 700, BTB 56 receives another entry corresponding to this instruction. As shown in FIG. 4d, this entry includes a tag $T_{700}$ identifying the branching instruction RETurn 700, a target value pointing to the instruction address of instruction 120 (i.e., the target of the RETurn), and a history value 010 indicating that the branching instruction is a subroutine return; according to this embodiment of the invention, BTB 56 also stores, associated with this entry, a branch-speculative stack pointer value $SP_{120}$, which is the current stack pointer value (that to be used by instruction 120), and therefore is the stack pointer value that is likely to be used on future passes through the subroutine EXMPL when called from instruction 110, as in this example.

For purposes of this example, the operation of microprocessor 10 according to this embodiment of the invention will now be described as it executes a second or subsequent pass of the code fragment shown hereinabove. This second pass will, of course, initiate with the fetch of instruction 110 in the pipeline. However, in this second pass, BTB 56 already has an entry stored therein that is identified by tag $T_{110}$, and that points to instruction 500 as the target of the subroutine CALL (indicated by HIS field 011). Fetch unit 26 will thus use the target address 500 from BTB 56 to fetch the instruction code for forwarding to predecode 0 stage 28.

In addition, according to this embodiment of the invention, the extension of BTB 56 also has an entry $SP_{500}$ as a branch-speculative stack pointer value that fetch unit 26 will send along with the instruction code for target instruction 500 as it progresses through the pipeline. This "hit" by BTB 56 in identifying the subroutine CALL of instruction 110 thus enables the speculative fetching and pipeline advancement of this CALL to subroutine EXMPL, and passes not only the target instruction address 500 but also passes a stack pointer value $SP_{500}$ that fetch unit 26 sends to predecode 0 stage 28 on lines $SP_{OUT}$. Stack pointer value $SP_{500}$ may be passed along the pipeline in several ways. For example, microprocessor 10 may include a special path to which lines $SP_{OUT}$ are connected so that stack pointer value $SP_{500}$ follows instruction 500 through the pipeline, for example as an "immediate" operand. Alternatively, stack pointer $SP_{500}$ may be stored in a temporary register in register file 39, for subsequent retrieval in the operand stage of the pipeline. Further in the alternative, stack pointer value $SP_{500}$ may bypass into a register file as a new "instance" of the stack pointer SP, if microprocessor incorporates register renaming techniques for avoiding pipeline dependencies.

In any event, according to this embodiment of the invention, the interlock that occurred due to stack pointer conflicts on the first pass through this code fragment, as described above, does not occur in subsequent passes through the code, due to the storage of the branch-speculative stack pointer value in BTB 56 and its forwarding, with the instruction sequence, through the pipeline.

As before, the execution of the CALL instruction 110 will store a speculative return address 120 and a speculative stack pointer value $SP_{110}$ in return address stack 55. The contents of BTB 56 and return address stack 55 after the execution of CALL instruction 110 on the second pass are shown in FIG. 4e. Subroutine EXMPL is then executed, in pipelined fashion, as in the manner described hereinabove for the first pass. At the point in the sequence at which the RETurn instruction 700 is again fetched, fetch unit 26 pops the speculative return address 120 from return address stack 56, and presents the instruction code fetched therewith to predecode 0 stage 28 along with the speculative stack pointer value $SP_{110}$ that was stored in return address stack 55 in association with the speculative return address value. Speculative execution of instruction 120 is then performed as in the first pass, with the verification of the actual return address and stack pointer value against the speculative values therefor again performed upon execution of the RETurn instruction 700.

Of course, in the fetching of RETurn instruction 700 through this second pass, BTB 56 will indicate that an entry is present for this branching instruction, including a target instruction address 120 and also a branch-speculative stack pointer value $SP_{120}$. Fetch unit 26 may therefore use these values to fetch the instruction code for instruction address 120, for presentation to predecode 0 stage 28 along with branch-speculative stack pointer value $SP_{120}$. Speculative execution of the instructions following the return from subroutine EXMPL may then carry on, without interlocks due to the conflict over the stack pointer, using these speculative address and stack pointer values. In this embodiment of the invention, however, where both BTB 56 and return address stack 55 include extensions for storing stack pointer values, it is preferred that fetch unit 26 use the speculative stack pointer value from return address stack 55 rather than the branch-speculative stack pointer value from BTB 56, as return address stack 55 was more recently written than was BTB 56, and thus its contents are more likely to match the actual return address and actual stack pointer value on execution of the return than are the contents of BTB 56.

As noted above, however, an alternative microprocessor construction may utilize only the stack pointer extension for BTB 56, and may not incorporate either return address stack 55 or the stack pointer extension thereof. In this case, the branch-speculative stack pointer value stored in BTB 56 will be used in the speculative execution of instructions following the return from subroutines, as described hereinabove. In addition, the stack pointer extension for BTB 56 also allows one to pass speculative stack pointer or other register values with conditional branches and other branching instructions.

As is apparent from the foregoing description, the preferred embodiment of the invention provides important advantages in the performance of a microprocessor and its data processing system, by enabling the storing of a register value in association with the destination instruction address of a branch operation. Particular advantages arise from the ability of a microprocessor constructed according to the preferred embodiment of the invention to speculatively execute instructions following a branch that involve stack operations and modifications to the stack pointer, as interlocks are prevented that may otherwise occur over conflicts in the use of the stack pointer, especially in the case of superscalar microprocessor architectures. Due to the large number of subroutine calls and returns that are present in many conventional computer programs, it is contemplated that the present invention will provide an important performance enhancement in these systems.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A pipelined microprocessor, comprising:

a plurality of execution units for executing a plurality of instructions simultaneously;

an instruction decode unit, for decoding instructions;

an instruction memory for storing instruction codes according to instruction addresses;

a fetch unit, for retrieving instruction codes from the instruction memory for a series of instructions, said fetch unit operating to retrieve a second instruction simultaneously with the execution of a first instruction by one of the plurality of execution units, said fetch unit comprising:

a branch prediction function for storing a speculative target instruction address upon execution of said first instruction corresponding to the address from which to continue execution subsequent to execution of a return type instruction, and for storing, in association with the speculative target instruction address, a speculative register value for use in speculatively executing instructions following said return-type instruction.

2. The microprocessor of claim 1, wherein the branch prediction function comprises:

a branch target buffer, having a plurality of entries, each entry having a tag portion for storing an identity indicator for a branching-type instruction, having a target portion for storing the target instruction address in association with the tag portion, and having a speculative value portion for storing the speculative register value in association with the tag and target portions.

3. The microprocessor of claim 2, wherein the speculative value portion of each of the plurality of entries in the branch target buffer is for storing a speculative stack pointer.

4. The microprocessor of claim 3, wherein the branch prediction function further comprises:

a return address stack for storing a speculative return address as the target instruction address and for storing, in association with the speculative return address, a speculative stack pointer value;

wherein the fetch unit stores the speculative return address and associated speculative stack pointer value in the return address stack responsive to executing an instruction of the subroutine call type;

and wherein the fetch unit retrieves the speculative return address and associated speculative stack pointer value responsive to fetching an instruction of the subroutine return type.

5. The microprocessor of claim 1, wherein the branch prediction function comprises:

a return address stack for storing a speculative return address as the target instruction address and for storing a speculative stack pointer value in association with the speculative return address;

wherein the fetch unit stores the speculative return address and associated speculative stack pointer value in the return address stack responsive to executing an instruction of the subroutine call type;

and wherein the fetch unit retrieves the speculative return address and associated speculative stack pointer value responsive to fetching an instruction of the subroutine return type.

6. The microprocessor of claim 1, wherein the instruction memory is dedicated to storing instructions.

7. The microprocessor of claim 6, wherein the instruction memory comprises a first level instruction cache.

8. The pipelined microprocessor according to claim 1, wherein said return type instruction is a return instruction.

9. The pipelined microprocessor according to claim 1, wherein said return type instruction is an instruction pair wherein the first instruction pops a stack address into a register and the second instruction branches to said stack address in said register.

10. A method of operating a pipelined microprocessor to speculatively execute instructions, comprising the steps of:

fetching a first instruction from an instruction memory, responsive to an instruction address;

decoding the first instruction fetched from the instruction memory;

executing the decoded first instruction in one of a plurality of execution units, which stores a speculative target instruction address and speculative register value in a branch prediction function;

fetching a second instruction which according to said branch prediction function's prediction, corresponds to said speculative target instruction address and speculative register value;

fetching and decoding a third and subsequent instructions using the speculative target instruction address; and executing said third and subsequent instructions and thereby supplying said speculative register value for use by the third and subsequent instructions until said second instruction executes and provides an actual target instruction address and an actual register value.

11. The method of claim 10, further comprising:

executing said second instruction to generate said actual target instruction address and said actual register value;

comparing the actual target instruction address to the speculative target instruction address;

comparing the actual register value to the speculative register value; and responsive to the actual target instruction address matching the speculative target instruction address and to the actual register value matching the speculative register value, continuing the execution of said subsequent speculative instructions.

12. The method of claim 10, wherein the first instruction corresponds to a subroutine call;

wherein the second instruction corresponds to a subroutine return;

wherein the speculative target instruction corresponds to the next sequential instruction after the subroutine call in a computer program containing the subroutine call.

13. The method of claim 12, wherein the register value corresponds to a stack pointer.

14. The method of claim 12, wherein the step of storing a speculative target instruction address stores the speculative target instruction address in a return address stack.

15. The method of claim 12, wherein the step of storing a speculative target instruction address stores the speculative target instruction address in a branch target buffer, associated with a tag value corresponding to the second instruction.

16. The method of claim 15, further comprising:

repeating the step of fetching the second instruction;

responsive to the step of fetching the second instruction, fetching the speculative target instruction address from the branch target buffer and the speculative register value associated therewith.

17. A microprocessor-based computer system, comprising:

an input device;

a display system;

a main memory; and a microprocessor, coupled to the input device, display system and main memory, and comprising:

a plurality of execution units for executing a plurality of instructions simultaneously;

an instruction decode unit, for decoding instructions;

an instruction memory for storing instructions according to instruction addresses;

a fetch unit, for retrieving instructions from the instruction memory for a series of instructions, said fetch unit operating to retrieve a second instruction simultaneously with the execution of a first instruction by one of the plurality of execution units, said fetch unit comprising:

a branch prediction function for storing a speculative target instruction address upon execution of said first instruction corresponding to the address from which to continue execution subsequent to execution of a return-type instruction, and for storing, in association with the speculative target instruction address, a speculative register value for use in speculatively executing instruction following said return-type instruction.

18. The system of claim 17, wherein the main memory includes a logical stack for storing a return address responsive to the microprocessor performing a subroutine call instruction;

wherein the microprocessor further comprises a stack pointer register, for storing an address corresponding to a current memory location in the logical stack;

wherein the speculative target instruction address stored in the branch prediction function corresponds to the return address;

and wherein the speculative register value stored in the branch prediction function corresponds to the value of the stack pointer register.

19. The system of claim 18, wherein a first execution unit initiates execution of instructions corresponding to the speculative target instruction address and those addresses of the next sequential instructions following said speculative target instruction address, using the speculative register value associated therewith;

and wherein, upon execution of a subroutine return instruction, the first execution unit:

retrieves the return address from the logical stack;

compares the return address to the speculative target instruction address;

compares the value of the stack pointer register to the speculative register value; and responsive to the return address matching the speculative target instruction address and to the value of the stack pointer register matching the speculative register value, continues execution of the instructions corresponding to the speculative target instruction address and said instructions with addresses sequentially following said speculative target instruction address.

20. The system of claim 17, wherein the branch prediction function comprises:

a branch target buffer, having a plurality of entries, each entry having a tag portion for storing an identity indicator for a branching-type instruction, having a target portion for storing the target instruction address in association with the tag portion, and having an speculative value portion for storing the speculative register value in association with the tag and target portions.

21. The system of claim 20, wherein the main memory includes a logical stack for storing a return address responsive to the microprocessor performing a subroutine call instruction;

wherein the microprocessor further comprises a stack pointer register, for storing an address corresponding to a current memory location in the logical stack;

wherein the branching type instruction corresponds to a subroutine return instruction, so that the target instruction address stored in the branch prediction function corresponds to the return address;

and wherein the speculative register value stored in the branch prediction function corresponds to the value of the stack pointer register.

22. The method according to claim 20, wherein said branching-type instruction is a subroutine call type instruction.

23. The method according to claim 20, wherein said branching-type instruction is a subroutine return type instruction.

24. The system of claim 17, wherein the branch prediction function comprises:

a return address stack for storing a speculative return address as the target instruction address and for storing a speculative register value in association with the speculative return address;

wherein the fetch unit stores the speculative return address and associated speculative register value in the return address stack responsive to executing an instruction of the subroutine call type;

and wherein the fetch unit retrieves the speculative return address and associated speculative register value responsive to fetching an instruction of the subroutine return type.

25. The system of claim 24, wherein the main memory includes a logical stack for storing a return address responsive to the microprocessor performing the subroutine call instruction;

wherein the microprocessor further comprises a stack pointer register, for storing an address corresponding to a current memory location in the logical stack;

wherein the target instruction address stored in the return address stack corresponds to the return address;

and wherein the speculative register value stored in the branch target buffer corresponds to the value of the stack pointer register.

* * * * *